United States Patent [19]

Walin

[11] Patent Number: 5,501,803
[45] Date of Patent: Mar. 26, 1996

[54] METHOD AND APPARATUS FOR SEPARATING PARTICLES FROM A BASE LIQUID

[75] Inventor: Gösta Walin, Nitaregatan, Sweden

[73] Assignee: Gosta Wahlin Havsteknik AB, Vastra Frolunda, Sweden

[21] Appl. No.: 122,455

[22] PCT Filed: Mar. 24, 1992

[86] PCT No.: PCT/SE92/00188

§ 371 Date: Jan. 17, 1994

§ 102(e) Date: Jan. 17, 1994

[87] PCT Pub. No.: WO92/16279

PCT Pub. Date: Oct. 1, 1992

[30] Foreign Application Priority Data

Mar. 25, 1991 [SE] Sweden ................. 910 0887

[51] Int. Cl.⁶ ................................................. B01D 21/20
[52] U.S. Cl. .................. 210/787; 210/512.3; 209/715; 209/722; 209/723; 209/725; 494/55
[58] Field of Search ....................... 210/787, 788, 210/512.1, 512.3; 209/715, 722, 723, 725; 494/52

[56] References Cited

U.S. PATENT DOCUMENTS

| | | | |
|---|---|---|---|
| 1,048,846 | 12/1912 | Mattern | 494/52 |
| 3,764,007 | 10/1973 | Schmid et al. | 209/173 |
| 5,229,014 | 7/1993 | Collins | 21/512.3 |

FOREIGN PATENT DOCUMENTS

| | | |
|---|---|---|
| 401360 | 10/1924 | Germany . |
| 650704 | 10/1937 | Germany . |

Primary Examiner—Robert A. Dawson
Assistant Examiner—David A. Reifsnyder
Attorney, Agent, or Firm—Dvorak and Traub

[57] ABSTRACT

A method and apparatus for separating from a base liquid, particles contained therein by introducing the base liquid between facing rotating surfaces which are imparted mutually different speeds of rotation relatively to the environment. The method is carried out in a container holding the liquid, wherein the two facing surfaces are rotationally symmetrical about an axis and preferably are in contact with the liquid in their entirety, and wherein the surfaces are used for radial boundary-layer transportation of the particles to be separated.

13 Claims, 5 Drawing Sheets

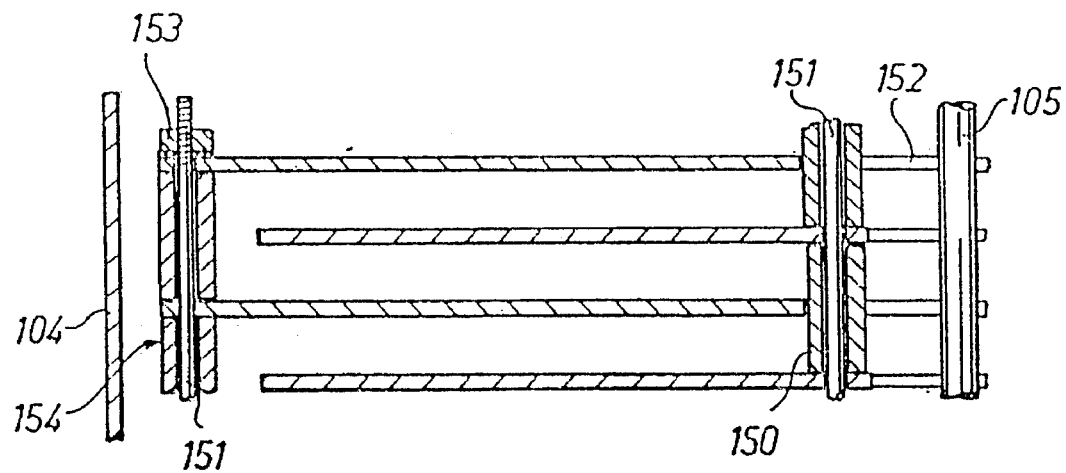
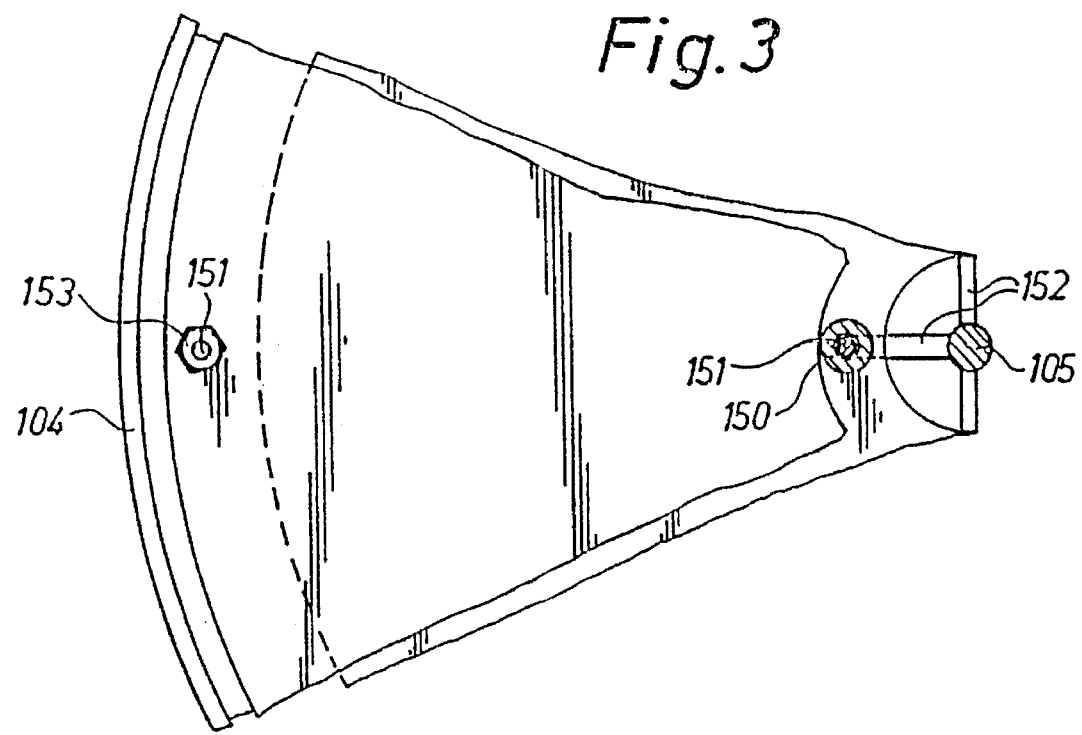

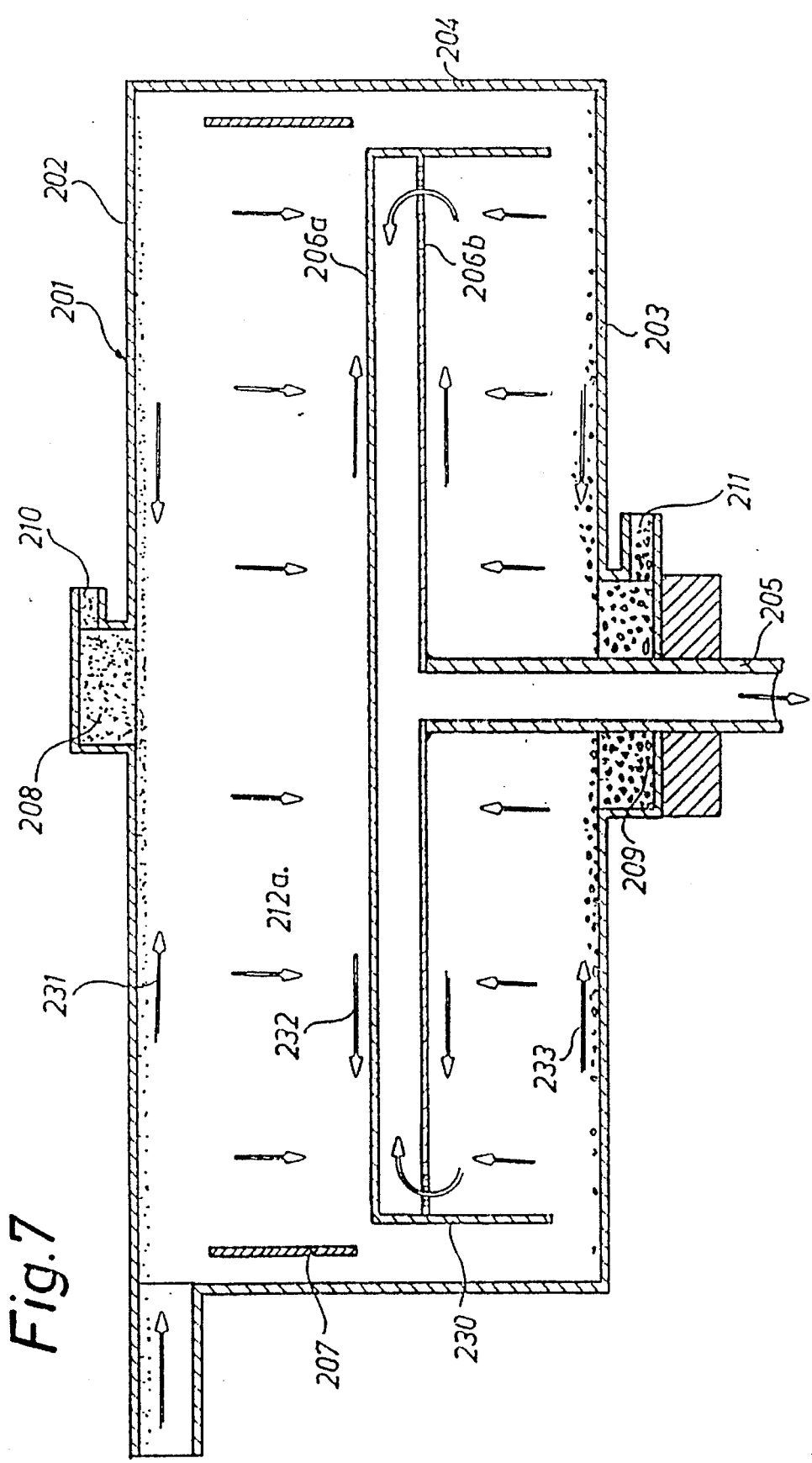

METHOD AND APPARATUS FOR SEPARATING PARTICLES FROM A BASE LIQUID

The subject invention concerns separation from a base liquid, of particles and other substances contained therein, having a density deviating from that of the base liquid.

The main purpose of the invention is to make it possible to separate, by simple means, such particles from the base liquid possible in an efficient manner.

Some examples of devices designed to perform the method in accordance with the invention will be described in the following with reference to the accompanying drawings, wherein:

FIG. 3 is a view from above of a portion of a detail component incorporated in the device shown in FIG. 2;

FIG. 4 is a vertical cross-sectional view corresponding to FIG. 2 of a portion of a detail incorporated in said device;

FIG. 7 is a schematic cross-sectional view corresponding to FIG. 1 through a device for separation of particles which are both lighter and heavier than the associated base liquid.

Figure 1:
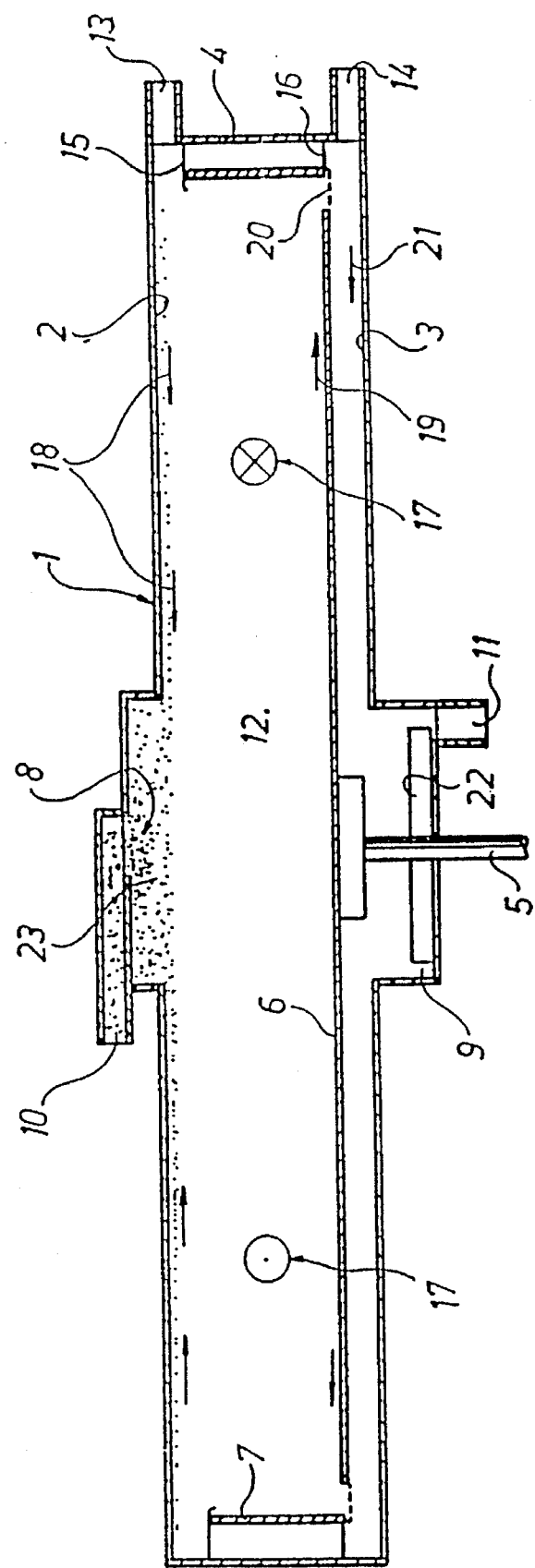
FIG. 1 is a schematic vertical cross-sectional view through a device primarily intended to separate light pollutants from a base liquid.

The device illustrated in FIG. 1 consists of a housing generally designated by 1 and comprising a ceiling 2, a floor 3 and an external lateral wall 4. At the floor of the housing, a rotatable disc 6 is mounted on a shaft 5 and supports at its periphery a cylindrical wall 7 which is arranged to take part in the rotational movement of the disc 6 as the shaft 5 is rotated. Centrally located in the ceiling 2 is formed a first collection pocket 8 and likewise in a central location the floor 3 is formed with a second collection pocket 9. An second outlet channel 10 debouches in the collection pocket 8 and an third outlet channel 11 debouches in the collection pocket 9. The external wall 4 preferably is cylindrical, having a curvature such that is extends along the cylindrical wall 7. An inlet channel 13 debouches into the upper part of a separation space 12 formed in the interior of the housing 1, through which inlet channel 13 is supplied the liquid to be cleaned, and into the lower part thereof debouches an first outlet channel 14 through which cleaned liquid is removed. Preferably the gap between the inlet channel 13 and the upper edge of the wall 7 is bridged by a covering flange 15 which may extend along the entire periphery of the wall 7 and the housing 1, respectively. Above the outlet channel an annular sealing member 16 may be provided on the wall 7 or on the disc 6 so as to take part in their rotational movement, the outer sealing edge then being close to the inner face of the wall 4 in the case the latter is cylindrical. When the wall 4 has a different configuration the annular sealing member 16 may instead be attached to said outer wall and project towards the rotating wall 7. The ceiling 2 and the disc 6 are designed to ensure that the body of liquid positioned intermediate these two components is rotationally symmetrical about the shaft 5 and the shaft prolongates through the housing. By this should be understood that the vertical distance between the facing surfaces of said components is essentially constant during the-entire rotational movement.

When a base liquid containing light pollutant particles etcetera is supplied continuously through the inlet channel 13 so as to fill the interior of the housing 1 entirely and the disc 6 is set in rotational movement, the main portion of the body of liquid present in the separation space, with the exception of thin boundary layers adjacent the walls, will be given a speed of rotation corresponding to about half the speed of rotation of the disc 6. The rotational movement is indicated by rotational signs 17, respectively. The base liquid fills the interior of the housing 1 and is removed therefrom in a continuous flow through the first outlet channel 14. The difference in speeds of rotation between the body of liquid and the upper and lower limitation faces generates radially directed boundary-layer flows alongside both limitation faces, towards the centre adjacent the stationary ceiling and outwards adjacent the rotating disc. The base liquid sinks comparatively uniformly through the entire horizontal cross section of the separation space 12. The lighter particles and similar elements are collected below the ceiling and are entrained by the moving boundary-layer flows in the direction indicated by arrows 18, towards the centre of the ceiling, where they are concentrated in the first collection pocket 8 positioned in this area, to be removed through the second outlet channel 10.

Adjacent the first collection pocket 8 and the second outlet channel 10 a suitable pump or other extraction means may be provided, the type of such means being chosen in accordance with the material to be removed. Any heavier particles that may be present in the liquid, are entrained by the moving boundary-layer flows in the direction indicated by arrows 19 towards the periphery of the disc and, carried by the base liquid, they pass through the passage 20 positioned at the disc periphery and towards the third outlet 11. Heavier particles falling onto the floor face 3 are entrained by the boundary-layer flows in the direction indicated by arrows 21, towards the centre and the second collection pocket 9 positioned there, to be removed through the third outlet channel 11, an arrangement which contributes to keeping the apparatus clean. Numeral reference 22 designates a feeder means which is secured on the shaft 5 in order to advance particles collected in the second pocket 9 towards the third outlet channel 11. The ceiling 2 of the housing and the disc 6 thus define surfaces arranged for relative rotation and facing one another in pairs and the extended projection of which surfaces extends at right angles to the rotational axis, in this case the horizontal plane and the essentially upright rotational axis around which the faces, as well as the volume contained between said faces, are rotationally symmetrical. With respect to the environment, the two faces thus have different velocities of rotation. In the subject case, the face formed by the ceiling 2 is immobile whereas the disc rotates, but it is quite conceivable to replace the downwardly facing ceiling face with the downwardly facing face of a rotating disc which should, however, still have a velocity of rotation deviating from that of disc 6. Preferably, the two faces are made to rotate in the same direction with respect to the environment in the case when, contrary to the situation in FIG. 1, one of the faces is not immobile. The rotational movements involved preferably should be comparatively slow. A suitable velocity of rotation is 0–5 rad/s, when one face is immobile. Higher speeds of rotation may be employed when both faces are arranged for rotation. The difference in speeds of rotation defines the through-flow and should be adjusted downwards to a value where satisfactory separation is obtained. In FIG. 1, numeral reference 23 designates the particles collected in the second collection pocket 8 and intended to be discharged through the second outlet channel 10. Should no heavier particles exist in the liquid or should any existing heavier particles be of a kind that cause no problem, the lower collection pocket and the outlet channel 11 associated therewith could be dispensed with.

Figure 2:
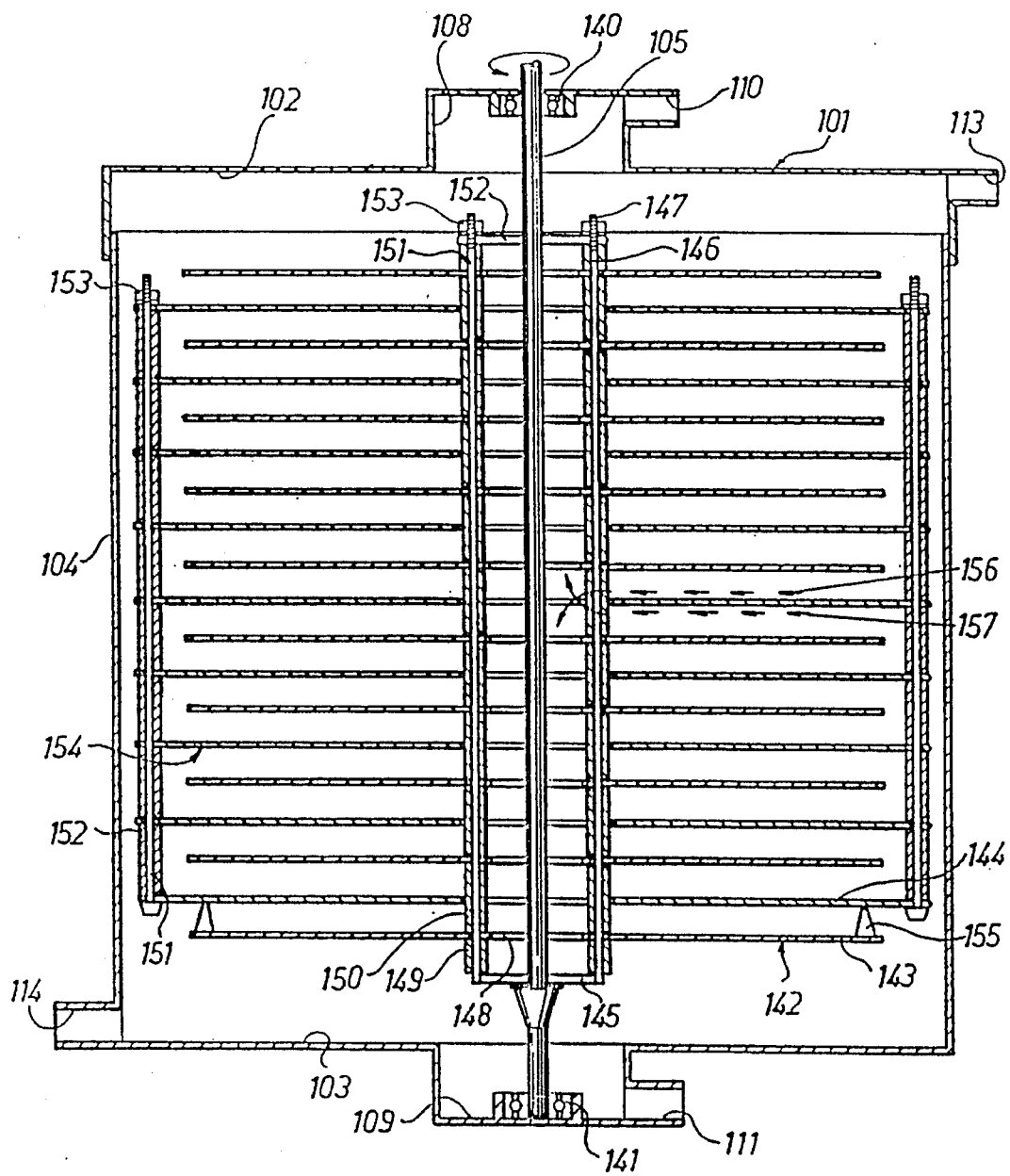
FIG. 2 is a corresponding vertical cross-sectional view through a further developement of the device in accordance with FIG. 1.

The further developed embodiment illustrated in FIG. consists, like in the preceding example, of a housing 101 having a ceiling 102, a floor 103, a preferably cylindrical lateral wall 104, an upper, centrally located first pocket 108 for removal of lighter particles, a bottom, centrally located second pocket 109 for removal of heavier particles, an second outlet channel 110 debouching into the upper removal pocket and an third outlet channel 111 debouching into the bottom removal pocket 109. A shaft 105 is rotatably mounted in an upper bearing 140 and a lower bearing 141, said shaft in turn supporting in the interior of the housing two packs 142, 154 of discs 143 and 144, respectively. Numeral reference 145 designates a lower, preferably disc-shaped support yoke, which is non-rotationally secured to the shaft 105. Reference numeral 151 designates a number of vertical rods which are spaced apart in the circumferential direction and which are formed at their upper ends with screw threads 147. The discs 143 comprise a centrally located hole 148 and a number of smaller holes, not illustrated in the drawings, which are positioned around the centre hole in positions corresponding to the positions of the rods 146. Numeral references 149 and 150 designate a number of spacer sleeves threaded onto the rods, spacer sleeve 149 supporting the lower one of the discs 143 at a suitable level above the support yoke 145 whereas spacer sleeves 150 maintain the discs 143 positioned thereabove in suitable mutually spaced apart positions. Reference numeral 146 designates an upper finishing sleeve over which a permeable collection means 152 is threaded onto the rods. The pack formed by the spacer sleeves 149, 150, 146, and the discs 143 are kept together by nuts 153. The discs 144 have a larger diameter size than the discs 143 and are formed with a centrally located hole through which the rods 151 with the spacer sleeves thereon are arranged to pass freely. A number of rods 151, each supporting spacer sleeve threaded thereonto, pass through the discs 144 along the periphery thereof. The discs 144 and the distance sleeves 150a form the pack 154 the components of which are kept together by the rods 151 and the nuts 153 which are tightened about the rod ends. Preferably, the height of the spacer sleeves 150a is approximately equal to that of the spacer sleeves 150 in accordance with the embodiment illustrated in the drawing figure, wherein discs associated with the pack 142 secured to the shaft 105 alternate with discs associated with the second pack which is generally designated by 154 and which is arranged to rotate with respect to the first pack. In order to maintain the discs of the pack 154 suitably spaced from the discs of the first pack 142, a spacer means 155 is secured on the lowermost disc of pack 142. The discs of the assembled packs 142, 154 preferably are mounted alternatingly from the floor and upwards, with interpositioning of the distance sleeves. The appearance of the various components incorporated in the embodiment of FIG. 2 is shown in more detail in FIGS. 3 and 4 which are shown on a larger scale.

When the housing 101 is filled with the liquid to be treated, flowing through the housing, and the shaft 105 is driven in a rotational movement by a suitable motor (not shown) or other propelling means, the pack 142 of discs will co-rotate at the same speed as the shaft whereas pack 154, as a result of the resistance of the liquid, will rotate at a lower speed than the first one. In this manner, facing pairs of disc faces will be given mutually different speeds of rotation, since such facing disc faces pertain to discs from different disc packs. Liquid to be treated which is supplied through the inlet 113, moves towards the first outlet 114 and on its way it is forced to pass between the various discs. This means that in each and every space between the discs, which also in accordance with this embodiment are rotationally symmetrical relatively to the shaft 105, a body of liquid is generated which rotates about the shaft 105 at a speed close to the average value of the speeds of rotation of the two disc packs. Because some of the discs move at a lower speed than the rest of the discs particles having a higher density than the base liquid and thus collect on the upper face of the lower speed discs, will be entrained by the moving boundary-layer and be displaced towards the centre in the direction indicated by arrows 156, and fall through the third centre hole of the discs down to the second collection pocket 109, from which they will be removed through the third outlet channel 111. Particles having a lower density than the base liquid and floating adjacent the lower face of the same discs 144 will also be entrained by the moving boundary-layer in the direction indicated by arrows 157 and towards the centre holes of the discs and be transferred through these holes upwards, towards the upper and first collection pocket 108, from which they are removed through the second outlet channel 110.

FIG. 7 illustrates yet another alternative embodiment which, like the preceding one, consists of a housing 201 having a ceiling 202, a floor 203 and a preferably cylindrical lateral wall 204. At the centre of the floor 203 a second collection pocket 209 is provided, in which heavy particles are collected, and in the ceiling 202 is provided a likewise centrally located first collection pocket 208 for lighter particles. In accordance with this embodiment, a tubular shaft 205 is rotatably mounted in the housing floor 203 and supports at its upper end portion a double disc, the upper disc portion of which is designated by 206a and the lower disc portion of which is designated by 206b. The two disc portions 206a and 206b are spaced apart, defining between them a flow space which communicates with the hollow interior of the shaft 205. From the periphery of disc portion 206a a cylindrical flange 230 projects downwardly. Numeral reference 207 designates a cylindrical flange which is arranged to rotate topether with the shaft 205 and the discs 206a, 206b.

Like in the embodiment in accordance with FIG. 1 boundary-layer displacement occurs in the direction indicated by arrows 231 alongside the ceiling 202, as a result of which lighter particles are concentrated towards the centre. Light-weight pollutants are deposited in the first collection pocket 208 and are carried away via the second outlet channel 210. The body of liquid generated inside the space 212a rotates slowly, approximately at half the speed of the speed of rotation of the disc 206a, 206b. Heavy particles fall downwards, towards the upper face of the upper disc portion 206a and are entrained by the base liquid in the direction of arrow 232 towards the disc periphery and further towards the floor 203, where they are exposed to the effects of the boundary-layer movement in the direction of arrows 233 and thus are transferred towards the central second collection pocket 209 from which the heavy particles are removed via the third outlet channel 211. The cleaned water flows through the space between the disc parts 206a and 206b and is discharped through the central channel of the shaft 205.

Figure 5:
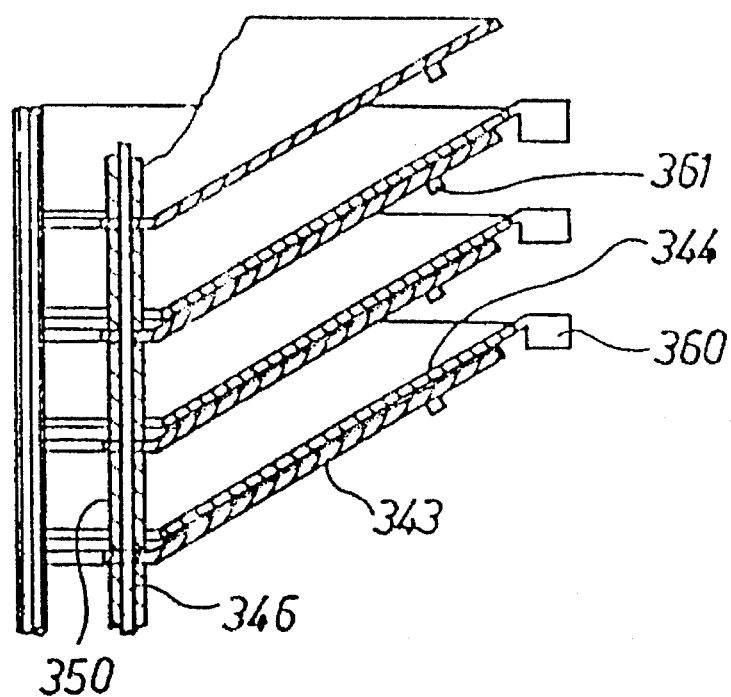
FIG. 5 is a partial sectional view corresponding to FIG. 4 and showing the corresponding detail component in accordance with an alternative embodiment in position of rest.
Figure 6:
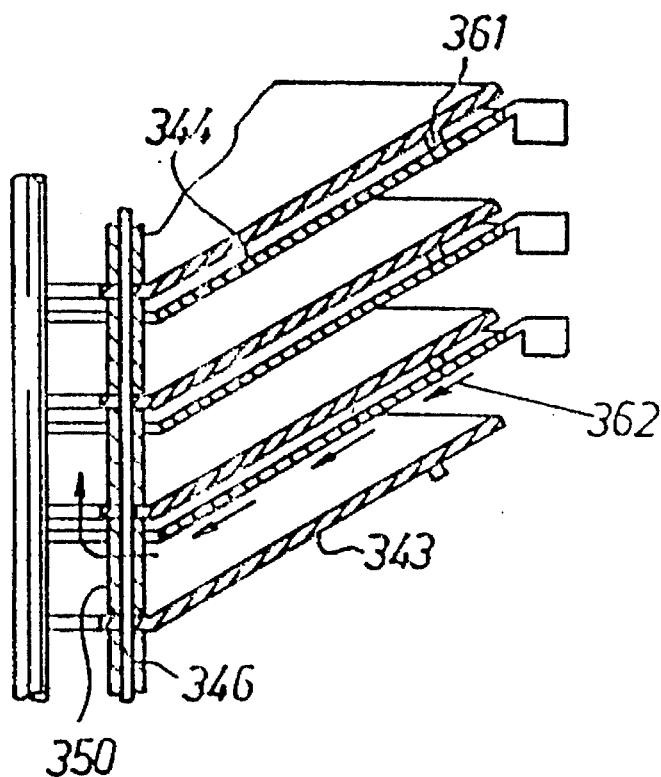
FIG. 6 is a partial sectional view corresponding to FIG. 5 of the same detail component in operative position.

FIGS. 5 and 6 show a modification of the embodiment illustrated in FIG. 2. In accordance with this embodiment the outer marginal portions of the discs 343 and 344, respectively, of the two disc groups, have been bent upwards. Like in the previous embodiment, the discs 343 kept together as a pack with the aid of rods and spacer sleeves 350. Discs 344, on the other hand, are arranged for free individual movement between the discs 343. In accordance with this embodiment, the discs 344 are formed adjacent their periphery with a number of brake vanes 360 which preferably are positioned at such an angle that in addition to having a braking effect they also cause the discs 344 upon rotation to lift into contact with the lower face of the discs 343. In order to prevent the discs 344 from adhering closely to the discs 343, spacer means 361 are provided on the lower disc faces.

This embodiment is best suited for separation of light particles, since the latter will float upwards in the inter-disc spaces and by the effect of the boundary-layer entrainment effect the particles will be moved in the direction of arrows 262 towards the centre of the pack, where they will float upwards and be removed at the top of the pack with the aid of suitable means. Because in this embodiment, the centrifugal force comprises a component which is perpendicular to the discs, this embodiment is suited for higher speeds of rotation.

The embodiments described in the aforegoing is primarily based on sedimentation and separation by means of the normal gravitational force. However, the scope of protection of the invention also encompasses the variety comprising arranging the marginal portions of e.g. the discs at an angle, for instance as in accordance with the embodiment shown in FIG. 2 and rotating them at such a high speed that dominating centrifugal forces are generated. In this case the rotational axis need not necessarily be vertical, since the desired sedimentation towards the various discs is effected by means of the centrifugal force rather than by gravity.

The embodiments have been described as having an upright shaft and an extended projection in the horizontal plane, i.e. a shaft which is essentially directed along the gravitational force and as a consequence thereof the horizontal plane is essentially perpendicular thereto. However, it is likewise conceivable to apply the same separation principles also in the case of arrangements with artificial gravitation, such as by mounting the device in a whirler.

The invention is not limited to the embodiments described in the aforegoing and illustrated in the drawings purely by way of examples and a number of modifications are possible within the scope of the appended claims without departing from the inventive idea. It is likewise within the scope to mutually combine the various embodiments in other ways than those indicated in the description of each separate embodiment. The concept expressed by "density deviating from the density of the base liquid" includes for instance the case when particle units having a different average density have been produced, as may be the case for instance in treatments with the aid of means increasing the flowability or sedimentability of the material to be separated.

I claim:

1. A device for separation from a base liquid of particles and other substances contained therein, the particles and other substances having a density deviating from a density of the base liquid, the device comprising:

a cylindrically-shaped and open housing formed by a ceiling, a floor, and an external connecting wall having an inner face, said external wall defining a housing periphery, an interior, and a central portion laterally inward from said external wall, said external wall further including an inlet channel near said ceiling and a first outlet channel near said floor, the housing further including a first collection pocket formed in said ceiling about said central portion of said housing, a second collection pocket formed in said floor about said central portion of said housing, said first and second pockets respectively coupled to a second and third outlet channel;

a first plurality of mutually spaced elements located at the interior of the housing; and a second plurality of mutually spaced elements located at the interior of the housing, the second plurality of mutually spaced elements interweaved with the first plurality of mutually spaced elements, wherein the first and second plurality of mutually spaced elements have surfaces substantially parallel to one another and form spaces therebetween, the first and second plurality of mutually spaced elements are movable in relation to one another, the inlet channel at the periphery located on one side of the rotatable element, and the first outlet channel at the periphery located on an opposing side of the rotatable element, wherein the base liquid and the particles and other substances contained therein are introduced into the housing through the inlet channel and into the spaces between the surfaces of the first and second plurality of mutually spaced elements, any particles and other substances separated from the base liquid are removed from the housing through the third outlet channel at the central portion of the housing, and the base liquid is removed from the housing through the first outlet channel at the periphery of the housing.

2. A device according to claim 1, wherein the first plurality of mutually spaced elements are rotatable about a rotation axis at a first rotation rate, and the second plurality of mutually spaced elements are rotatable about the rotation axis at a second rotation rate different from the first rotation rate, the first and second plurality of mutually spaced elements each having a centrally located hole, the first plurality of mutually spaced elements coupled to a central rotatable shaft by a yoke.

3. A device according to claim 2, wherein a rod extended through an inner peripheral portion of the first plurality of mutually spaced elements couples the first plurality of mutually spaced elements to the yoke, and spacers disposed on the rod separate the first plurality of mutually spaced elements, an inner peripheral edge of the second plurality of mutually spaced elements disposed about the rod and yoke, and an outer peripheral edge of the second plurality of mutually spaced elements extending beyond an outer peripheral edge of the first plurality of mutually spaced elements.

4. A device according to claim 1, wherein the first and second plurality of mutually spaced elements each having a centrally located hole, the first plurality of mutually spaced elements coupled to a central rotatable shaft by a yoke, and the second plurality of mutually spaced elements are disposed on the first plurality of mutually spaced elements, the second plurality of mutually spaced elements each having a vane disposed on an outer periphery at an angle that changes the rotation rate of the second plurality of mutually spaced elements in relation to the rotation rate of the first plurality of mutually spaced elements, the vanes also causing the second plurality of mutually spaced elements to be lifted in relation to the first plurality of mutually spaced elements upon rotation thereof.

5. A device according to claim 4, wherein a spacer separates the first and second plurality of mutually spaced elements when the second plurality of mutually spaced elements are lifted in relation to the first plurality of mutually spaced elements upon rotation thereof.

6. A device according to claim 5, wherein the housing further comprises a third outlet channel at a central portion of the housing, wherein lighter particles and other substances separated from the base liquid are removed from the second outlet channel at the central portion of the housing, and heavier particles and other substances separated from the base liquid are removed from the third outlet channel at the central portion of the housing.

7. A device according to claim 6, wherein the housing further comprises a first collection pocket at a central portion of the housing, and a second collection pocket at a central portion of the housing, the first and second collection pockets are located on opposing sides of the first and second mutually space elements.

8. A device according to claim 4, wherein the first and second plurality of mutually spaced elements are disks with a conical section portion.

9. A device according to claim 1, wherein the housing further comprises a second outlet channel at a central portion of the housing, wherein lighter particles and other substances separated from the base liquid are removed from the second outlet channel at the central portion of the housing and heavier particles and other substances separated from the base liquid are removed from the third outlet channel at the central portion of the housing.

10. A device according to claim 9, wherein the housing further comprises a first collection pocket at a central portion of the housing, and a second collection pocket at a central portion of the housing, the first and second collection pockets are located on opposing sides of the first and second plurality of mutually space elements.

11. A device for separation from a base liquid of particles and other substances contained therein, the particles and other substances having a density deviating from a density of the base liquid, the device comprising:

a cylindrically-shaped and open housing formed by a ceiling, a floor, and an interconnecting external wall having an inner face, said external wall defining a housing periphery, an interior, and a central portion laterally inward from said external wall, said external wall further including an inlet channel near said ceiling and a first outlet channel near said floor, said housing further including a first collection pocket formed in said ceiling about said central portion of said housing, a second collection pocket formed in said floor about said central portion of said housing, said first and second pockets respectively coupled to a second and third outlet channel;

a cylindrically configured rotatable disk received within said housing interior and having a ceiling-facing surface substantially parallel to said ceiling and a disk periphery, said ceiling-facing surface including an upstanding wall along said periphery, said upstanding wall having an upper edge and being separated from said inner face of said external wall, thereby defining a gap therebetween, said upstanding wall further including a covering flange integrally formed at said upper edge of said wall to bridge said gap, and a sealing member provided on said upstanding disk wall between said disk wall and said inner face of said external wall to bridge said gap;

a rotatable shaft with a vertical rotational axis, said shaft inserted through said floor of said housing at said central portion and normal thereto, said shaft rotatably coupled to said rotatable disk such that the ceiling-facing surface of said disk moves relative to said ceiling and defines a space therebetween for receiving the base liquid therebetween;

wherein the base liquid and the particles and other substances contained therein are introduced into the housing through the inlet channel and into the space between the ceiling and the disk such that lighter particles and other substances are separated from the base liquid and are removed from the housing through the second outlet channel, while heavier particles and other substances separated from the base liquid are removed from the housing through the third outlet channel.

12. A device according to claim 11, wherein the rotatable disk is coupled to a by tubular and hollow shaft, the rotatable disk including an upper portion and a lower portion said upper and lower portions vertically separated from each other, thereby creating a space, wherein the third outlet channel is indirectly coupled to a port in the lower portion of the rotatable disk, which said port connects the flow space between the upper and lower portions of the rotatable disk to the tubular and hollow rotatable shaft.

13. A method for separation from a base liquid of particles and other substances contained therein, the particles and other substances having a density deviating from a density of the base liquid, the method comprising steps of:

providing a housing with a floor, a ceiling, a connecting peripheral wall, a central portion, and an interior space;

further providing a rotatable element for reception within said housing interior, said housing further including a first collection pocket in said ceiling and a second collection pocket in said floor, and an inlet channel and a first outlet channel in said peripheral wall, said first collection pocket coupled to a second outlet channel and said second collection pocket coupled to said third outlet channel;

providing a rotatable element within the interior of said housing, said rotatable element comprising a first plurality of mutually spaced elements and a second plurality of mutually spaced elements, the second plurality of mutually spaced elements interweaved between the first plurality of elements such that the first and second plurality of mutually spaced elements have respective surfaces which are substantially parallel to one another and form spaces therebetween;

introducing the base liquid and the particles and other substances contained therein into the inlet channel at the periphery of the housing and into the space between the first and second surfaces of the rotatable element;

rotating the first and second elements relative to one another in the same direction and moving the first and second elements towards and away from one another based on rotational rates;

separating particles and other substances having a density deviating from the density of the base liquid;

collecting any particles and other substances lighter than the base liquid in the first collection pocket and then removing the lighter particles and substances through the second outlet channel;

collecting any particles and other substances heavier than the base liquid in the second collection pocket and then removing the heavier particles and substances through the third outlet channel, the second and third outlet channels being disposed on opposing sides of the rotatable element at the central portion of the ceiling and floor, respectively;

removing the base liquid from the housing through the first outlet channel.

* * * * *

UNITED STATES PATENT AND TRADEMARK OFFICE
CERTIFICATE OF CORRECTION

PATENT NO. : 5,501,803
DATED : March 26, 1996
INVENTOR(S) : Gosta Walin

It is certified that error appears in the above-indentified patent and that said Letters Patent is hereby corrected as shown below:

On the title page, item [73] Assignee change "...WAHLIN..." to

--...WALIN...--.

Signed and Sealed this

Fifth Day of November, 1996

Attest:

Attesting Officer

BRUCE LEHMAN
Commissioner of Patents and Trademarks